United States Patent
Kim et al.

(10) Patent No.: US 7,130,475 B2
(45) Date of Patent: *Oct. 31, 2006

(54) APPARATUS AND METHOD OF ENCODING/DECODING A CODED BLOCK PATTERN

(75) Inventors: Jae-Kyoon Kim, Seoul (KR); Jin-Hak Lee, Taejon (KR); Kwang-Hoon Park, Inchon (KR); Joo-Hee Moon, Seoul (KR); Sung-Moon Chun, Seoul (KR); Jae Won Chung, Kyoungki-do (KR)

(73) Assignee: Hyundai Curitel, Inc. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/186,493

(22) Filed: Jul. 20, 2005

(65) Prior Publication Data

US 2005/0254583 A1 Nov. 17, 2005

Related U.S. Application Data

(63) Continuation of application No. 10/395,781, filed on Mar. 24, 2003, now Pat. No. 6,944,351, which is a continuation of application No. 09/306,743, filed on May 7, 1999, now Pat. No. 6,571,019, which is a continuation-in-part of application No. 08/740,300, filed on Oct. 25, 1996, now abandoned.

(30) Foreign Application Priority Data

Oct. 26, 1995 (KR) .................................. 95-37918
Oct. 5, 1996 (KR) .................................. 96-44049

(51) Int. Cl.
  G06K 9/36 (2006.01)
  H04N 7/12 (2006.01)
(52) U.S. Cl. .................................. 382/246; 375/240.23
(58) Field of Classification Search ........ 382/232–233, 382/241–246, 250–251, 266, 276, 305; 375/240.03, 375/240.18, 240.2, 240.23–24; 341/65, 67; 358/539; 348/14.13
See application file for complete search history.

(56) References Cited

U.S. PATENT DOCUMENTS

| | | | | |
|---|---|---|---|---|
| 5,341,441 A | * | 8/1994 | Maeda et al. | ................ 382/253 |
| 5,452,104 A | * | 9/1995 | Lee | ......................... 358/426.14 |
| 5,647,024 A | * | 7/1997 | Kawauchi et al. | .......... 382/232 |

* cited by examiner

*Primary Examiner*—Kanjibhai Patel
(74) *Attorney, Agent, or Firm*—Blakely Sokoloff Taylor & Zafman

(57) ABSTRACT

The present invention selectively applies one of VLC tables stored in a memory for encoding a coded block pattern of a macroblock according to the number of blocks having an object within the macroblock, the number of blocks obtained using shape information, thereby reducing the amount of data transmitted and increasing coding efficiency. The present invention also selectively applies one of VLD tables stored in a memory for decoding a coded block pattern of a macroblock according to the number of blocks having an object within the macroblock, the number of blocks obtained using shape information.

15 Claims, 14 Drawing Sheets

FIG. 4 (PRIOR ART)

| index | CBP(INTRA) Y1-Y2-Y3-Y4 | CBP(INTER) Y1-Y2-Y3-Y4 | Number of Bits | Code |
|---|---|---|---|---|
| 0 | 0000 | 1111 | 4 | 0011 |
| 1 | 0001 | 1110 | 5 | 0010 1 |
| 2 | 0010 | 1101 | 5 | 0010 0 |
| 3 | 0011 | 1100 | 4 | 1001 |
| 4 | 0100 | 1011 | 5 | 0001 1 |
| 5 | 0101 | 1010 | 4 | 0111 |
| 6 | 0110 | 1001 | 6 | 0000 10 |
| 7 | 0111 | 1000 | 4 | 1011 |
| 8 | 1000 | 0111 | 5 | 0001 0 |
| 9 | 1001 | 0110 | 6 | 0000 11 |
| 10 | 1010 | 0101 | 4 | 0101 |
| 11 | 1011 | 0100 | 4 | 1010 |
| 12 | 1100 | 0011 | 4 | 0100 |
| 13 | 1101 | 0010 | 4 | 1000 |
| 14 | 1110 | 0001 | 4 | 0110 |
| 15 | 1111 | 0000 | 2 | 11 |

FIG. 11

| index | CBP(INTRA) (1) | CBP(INTER) (1) | Number of Bits | Code |
|---|---|---|---|---|
| 0 | 0 | 1 | 1 | 0 |
| 1 | 1 | 0 | 1 | 1 |

FIG. 12

| index | CBP(INTRA) (12) | CBP(INTER) (12) | Number of Bits | Code |
|---|---|---|---|---|
| 0 | 00 | 11 | 4 | 0001 |
| 1 | 01 | 10 | 3 | 001 |
| 2 | 10 | 01 | 2 | 01 |
| 3 | 11 | 00 | 1 | 1 |

FIG. 13

| index | CBP(INTRA) (123) | CBP(INTER) (123) | Number of Bits | Code |
|---|---|---|---|---|
| 0 | 000 | 111 | 3 | 011 |
| 1 | 001 | 110 | 6 | 0000 01 |
| 2 | 010 | 101 | 5 | 0000 1 |
| 3 | 011 | 100 | 3 | 010 |
| 4 | 100 | 011 | 5 | 0001 0 |
| 5 | 101 | 010 | 5 | 0001 1 |
| 6 | 110 | 001 | 3 | 001 |
| 7 | 111 | 000 | 1 | 1 |

US 7,130,475 B2

APPARATUS AND METHOD OF ENCODING/DECODING A CODED BLOCK PATTERN

RELATED APPLICAITONS

This is a Continuation application of Ser. No. 10/395,781 filed Mar. 24, 2003, now U.S. Pat. No. 6,944,351 which is a Continuation application of Ser. No. 09/306,743 filed May 7, 1999, U.S. Pat. No. 6,571,019, which is a Continuation-In-Part Application of Ser. No. 08/740,300 filed Oct. 25, 1996 and now abandoned.

BACKGROUND OF THE INVENTION

1. Field of the Invention

The present invention relates to coded block pattern (CBP) encoding and decoding in a video signal encoding and decoding system and more particularly to CBP encoding/decoding apparatus and method wherein one of variable length coding (VLC)/variable length decoding (VLD) tables stored in a memory is selectively applied for encoding and decoding a coded block pattern of a macroblock according to the number of blocks having object pixels within the macroblock, which is detected using shape information.

2. Description of Related Art

Generally, video signal compressive encoding and decoding allows not only transmission of video information via low rate channels and but also reduction of memory requirement for storing the video. Therefore, compressive encoding and decoding techniques are very important to the multimedia industry requiring applications such as storage and transmission of video.

As standardization of information compressing methods have been required for compatibility of information and extension of multimedia industry, standards for video is established based upon various applications. Representative standards for video encoding and decoding are H.261 recommended by ITU-T (International Telecommunication Union-Telecommunication Standardization Sector, old CCITF) for transmitting video information for video phone and video conferencing via ISDN (Integrated Service Digital Network), H.263 recommended by ITU-T for transmitting the video information via PSTN (Public Switched Telephone Network), MPEG (Moving Picture Experts Group)-1 recommended by ISO/IEC JTC 1/SC29/WG11 (International Standardization Organization/International Electrotechnical Commission Joint Technical Committee 1/Sub Committee 29/Working Group 11) MPEG for storing video in digital storage media (DSM), and MPEG-2 for high definition digital broadcasting such as EDTV (Enhanced Digital Television) and HDTV (High definition Television).

Compressive encoding of still image signals also has been standardized and JPEG (Joint Photographic Coding Experts Group) recommended by ISO/IEC JTC1/SC29/WG1 is a representative standard.

Such conventional video signal coding methods encode a rectangular frame or a whole picture, thus called frame-based coding. This frame-based coding method encodes texture information (e.g., luminance and chrominance) of all picture elements (pels or pixels) forming the frame.

Recently, however, instead of coding and transmitting the whole frame, there are increased demands for multimedia products and service including a function of coding and transmitting or manipulating only a particular region (or object) that a user is interested in or wants for some necessities.

In response to this tendency, an object-based coding method of encoding an image in units of arbitrarily shaped region has been actively studied, as the alternative to the frame-based coding that encodes the whole frame, FIG. 1 and FIG. 2 show examples of test prior art images used for explaining the object-based coding. FIG. 1 shows a frame including a picture of two children playing with a ball in a certain space (background). The object-based coding is appropriate for the case that only information on an object composed of children and a ball in the video information is needed for transmission. Namely, only texture information values of pixels forming the children and ball are encoded and transmitted. Here, the region of the children and ball is called an object and the other region than or excluding the object is called a background.

For compressively encoding the image shown FIG. 1 using the object-based coding, an encoder and a decoder should equally recognize which pixels of the whole frame pixels are for the children and ball and which pixels of the whole frame pixels are for the background. Such information is called shape information. The encoder should efficiently encode and transmit the shape information to the decoder to permit the decoder to recognize the shape information. The largest difference between the frame-based encoder/decoder and the object-based encoder/decoder is that the object-based encoder/decoder includes a shape information encoder/decoder.

FIG. 2 shows shape information when only the children and ball is considered as an object dmong the video information. The pixels forming the children and ball have bright values and the pixels forming the background have dark values.

In order to discriminate the pixels forming the object from the pixels forming the background as shown in FIG. 2, the pixels are represented by shape information having predetermined values according to regions they belong to. This is called a binary mask. For example, all the pixels belonging to the background have a value "0" and all the pixels belonging to the objet have a value "255", so that each pixel has one value between "0" and "255". For the object-based coding, the shape information for identifying and discriminating object pixels and background pixels among all the pixels forming a whole picture is required. Each of the object pixels has the texture information.

The shape information can be represented by a contour indicating a boundary between the background and the object other than the binary mask. The two types are alternative. Contour extraction is carried out to express the binary mask as contour information. Alternatively, contour filling is carried out to obtain the binary mask from the contour information. For the purpose of encoding and transmitting to the decoder the shape information with the small amount of bits, effective shape information coding method is required. This shape information coding method is not related to the present invention, so the detailed description on it will be omitted.

Representative frame-based coding methods are H.261 and H.263 recommended by ITU-T, MPEG-1 and MPEG-2 by ISO/IEC JTC1/SC29/WG11, and JPEG by ISO/IEC JTC1/SC29/WG1. Representative object-based coding methods are MPEG-4 recommended by ISO/IEC JTC1/SC29/WG11 and JPEG2000 by ISO/IEC JTC1/SC29/WG1.

A conventional video signal coding method used most widely in the world is transform coding. The transform coding converts video signals into transform coefficients (or frequency coefficients) to suppress transmission of high frequency components and to transmit signals of low frequency components. This method has an advantage of increasing a compression ratio with reduction of loss in picture quality. Discrete Fourier transform (DFT), discrete cosine transform (DCT), discrete sine transform (DST), and Walsh-Hadamard transform (WHT) have been developed for the transform coding.

The DCT of the transform methods is excellent in compactness of video signal energy into the low-frequency component. Compared with other transform methods, the DCT provides high picture quality with only the small number of low frequency coefficients and has a fast algorithm. Due to these advantages, the DCT is the most generally used transform coding and employed for the video coding standardization systems such as H.261, H.263, MPEG-1, MPEG-2, MPEG-4, and JPEG.

The conventional frame-based coding divides a frame into macroblocks each respectively having 16 pixels in length and width (hereinafter this size is expressed as 16*16) and carries out the coding in the unit of macroblock. Namely, motion estimation, motion compensation, and coding type decision is carried out with respect to the unit macroblock. The coding type determines whether to encode an input video signal or motion compensation error signal of the macroblock. A macroblock corresponding to the former is called an intra macroblock and a macroblock corresponding to the latter is called an inter macroblock.

According to conventional techniques, the DCT is performed with respect to input signals determined in accordance with the coding type and transform coefficients are transmitted. Here, the macroblock is divided into blocks of 8*8 and the DCT is performed in the unit of this block.

FIG. 3 is part of the prior art and shows the relationship between a macroblock and blocks. As shown in FIG. 3, the macroblock comprises four blocks, Y1, Y2, Y3, and Y4. Transform coefficients of blocks are quantized. The quantized coefficients marshaled on the two-dimensional blocks are re-marshaled in one dimension through scanning and then variable length coded for transmission to a receiver.

The transform coefficients are classified into a DC coefficient and an AC coefficient. The DC coefficient represents an average value of an input blocl signal. The DC coefficient has different meanings according to the coding type of a corresponding input macroblock, such as the inter macroblock or intra macroblock. For the intra macroblock, the motion compensation error is coded, so that the DC coefficient has a peripheral value in many cases. For the inter macroblock, the input video signal is coded, so that the DC coefficient has the average value of the input video signal and is used as very important information. For these reasons, many coding methods discriminate DC information from the AC information and transmit the information in detail. On the other hand, the DC coefficient may be not discriminated from the AC coefficient during the coding based upon the reason that the DC coefficient does not have large value in the intra coding.

The variable length coding (VLC) is a method for transmitting the AC coefficient. Once transform coefficients are marshaled in one dimension after passing through the scanning, a none-zero AC coefficient is two-dimensional VL-coded through combination coding of a distance to a previous none-zero AC coefficient and its own magnitude. For the last none-zero coefficient in a corresponding block, an end of block (EOB) signal is transmitted. Alternatively, three-dimensional VLC is employed for the combination of three pieces of information of a distance to another none-zero AC coefficient, a magnitude of a pertinent coefficient itself, and LAST information indicating whether the pertinent coefficient itself is the last none-zero one or not.

If all the quantized coefficients—AC and DC coefficients, or AC coefficients if the DC coefficient is separately encoded—have a value "0", there is no data transmitted. At this time, the encoder transmits information indicating whether or not each block has data transmitted to the decoder. This kind of information is transmitted once per macroblock by combining information on four blocks of the macroblock. The combined information is called a coded block pattern. Each macroblock comprises four blocks and each block is subjected to one of two cases of having and not having data transmitted, so the coded block pattern has 16 possible cases.

FIG. 4 is a prior art VLC table for coded block patterns used in the frame-based coding.

The second column of FIG. 4 shows 16 cases of the coded block pattern of an intra macroblock. Starting from the most left one, four digits made of "0" and "1"respectively indicate existence/non-existence of data with respect to the blocks, Y1, Y2, Y3, and Y4 of FIG. 3. Here, "0" indicates nonexistence of data coded and "1" indicates existence of data coded. For example, "0101" means that the blocks Y1 and Y3 have data transmitted and the blocks Y2 and Y4 do not have data transmitted. The third column of FIG. 4 shows cases of an inter macroblock.

Although 4-bit fixed length coding (FLC) can be applied to each coded block pattern since the coded block pattern has 16 cases, but the VLC is applied to reduce the amount of bits generated. In other words, length of a code is differently assigned according to how open a case happens. For example, the more the case happens, the less the number of bits of a code is assigned and the less the case happens, the more the number of bits of a code is assigned. The fifth column of FIG. 4 shows codes used in H.263 and the fourth column shows the number of bits of each code.

The frequency in occurrence of a coded block pattern can be different according to a coding method. In case of H.263, the intra macroblock and the inter macroblock each have a different frequency in occurrence of the coded block pattern, so VLC tables for coded block patterns are differently set for the intra macroblock and inter macroblock. A particular thing is that the frequency in occurrence of coded block patterns of the intra macroblock and inter macroblock are similar to each other when the coded block patterns are in relation of 2's complement. According to the table shown in FIG. 4, the coded block pattern "1111" occurs most frequently in ease of the intra macroblock and the coded block pattern "0000" occurs most frequently in case of the inter macroblock. In case of the inter macroblock, the motion compensation error is coded, so it often happens that there is no data transmitted when motion estimation is accurate or a quantization interval is large. In case of the intra macroblock, the input video signal is coded, so most cases have data transmitted when video signals are not uniform. The coded block pattern "0110" of the inira maeroblock and the coded block pattern "1001" of the inter macroblock have least frequency in occurrence.

Although different coded block patterns are used according to the coding type, the same table is used, so the same volume of memory is used regardless of coding type.

The object-based coding also performs the coding such as DCT in the unit of block and determines the coded block pattern in the unit of macroblock. However, if the VLC table for coded block patterns used in the frame-based coding is directly applied to the object-based coding, decrease of coding efficiency is resulted in.

FIG. 5 is part of the prior art and shows an example of an input signal in the object-based coding. MB1, MB2, MB3, and MB4 respectively indicate top left, top right, bottom left, and bottom right macroblocks and each macroblock comprises Y1, Y2, Y3, and Y4 blocks. An oval-shaped, hatched part indicates a group of pixels belonging to an object (object pixels). Three blocks Y2, Y3, and Y4 of MB1 respectively include at least one object pixel. The block Y1 of MB1 has no data transmitted. Accordingly, in case that MB1 is the intra macroblock, cases corresponding to indexes 8–15 shown in the first column of FIG. 4 do not occur. At this time, the VLC table of FIG. 4 can be used, but this is inefficient. M133 has only the block Y2 as a block including the object pixel. In case that MB3 is the intra macroblock, the blocks Y1, Y3, and Y4 do not have data transmitted, and 14 cases other than cases corresponding to indexes 0 and 4 of FIG. 4 do not occur. At this time, the table of FIG. 4 can also be used, but this is inefficient.

As illustrated, the conventional coded block pattern encoding uses one VLC table for coded block patterns that is used in the frame-based coding even though macroblocks have different numbers of blocks where an object is present, thereby reducing coding efficiency.

SUMMARY OF THE INVENTION

Accordingly, the present invention is directed to coded block pattern encoding/decoding apparatus and method that substantially obviates one or more of the limitations and disadvantages of the related art.

An objective of the present invention is to provide coded block pattern encoding apparatus and method wherein one of VLC tables stored in a memory is selectively applied for encoding a coded block pattern of a macroblock according to the number of blocks having an object within the macroblock, the number of blocks detected using shape information.

Another objective of the present invention is to provide coded block pattern decoding apparatus and method wherein one of VLD tables stored in a memory is selectively applied for decoding a coded block pattern of a macroblock according to the nupiber of blocks having an object within the macroblock, the number of blocks detected using shape information.

Additional features and advantages of the invention will be set forth in the following description, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, a coded block pattern encoding apparatus comprises: a variable length coding (VLC) table selection unit for detecting blocks where object pixels are present at a macroblock to be coded based upon incoming shape information and generating a control signal for selecting one of a plurality of VLC tables according to the number of blocks where the object is present; and a coded block pattern encoding unit for selecting one of the plurality of VLC tables according to the control signal output from the VLC table selection unit and encoding quantized coefficients with the selected VLC table to provide a coded block pattern.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 is a VLC table for coded block patterns used in conventional frame-based coding;

FIG. 11 shows a VLC table for coded block patterns in case that the number of non-transparent blocks is 1 according to the present invention;

FIG. 12 shows a VLC table for coded block patterns in case that the number of non-transparent blocks is 2 according to the present invention;

FIG. 13 shows a VLC table for coded block patterns in case that the number of non-transparent blocks is 3 according to the present invention;

DETAILED DESCRIPTION OF PREFERRED EMBODIMENT

Reference will now be made in detail to the preferred embodiments of the present invention, examples of which are illustrated in the accompanying drawings.

Figure 6:
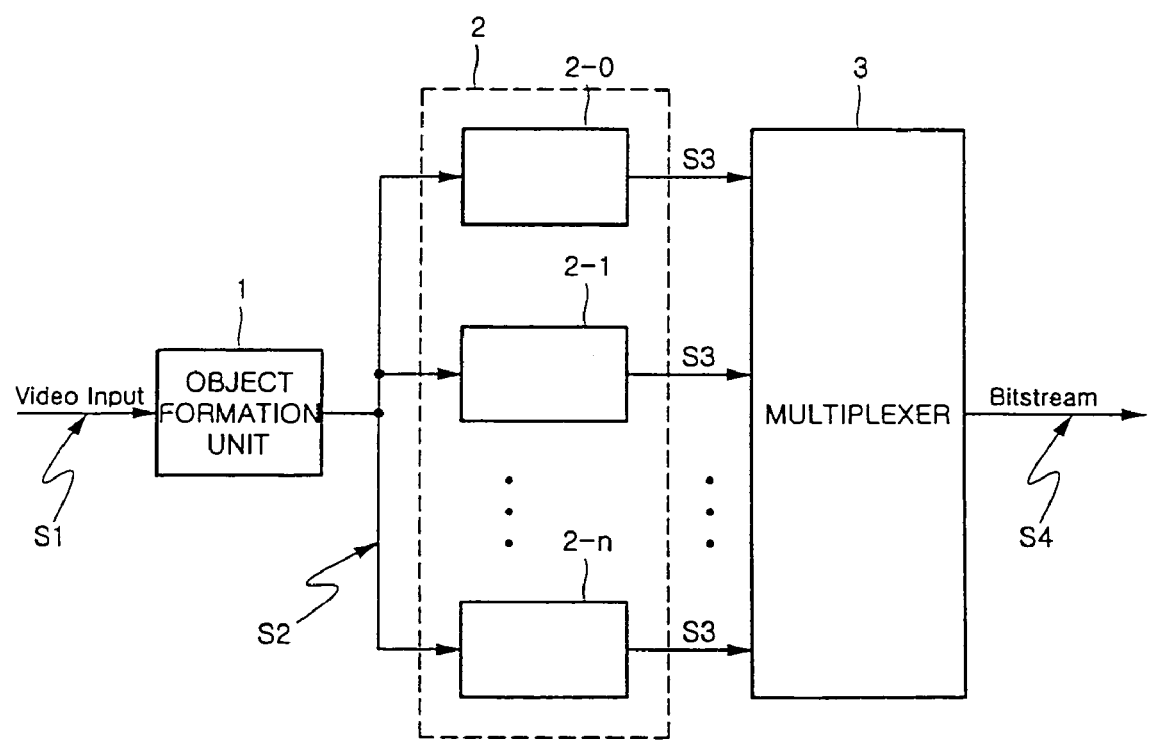
FIG. 6 is a schematic block diagram of a conventional prior art object-based encoder.

The preferred embodiments of the present invention according to the technical ideas described above will be described in detail with reference to the accompanying drawings. FIG. 6 shows an object-based video coding system for dividing input video signal S1 into arbitrarily shaped objects and performs encoding in units of object.

As shown in FIG. 6, the input video signal S1 is applied to object formation unit 1. The object formation unit 1 divides the input video signal S1 into objects and obtains shape information and texture information of each object. Output signls S2 are applied to object encoding unit 2 and encoded on basis of object in respective object encoders 2-0, 2-1, . . . , 2-n. Outputs S3 from the object encoders 2-0, 2-1, . . . , 2-n, namely, bitstreams of different objects, are multiplexed in multiplexer 3 and then outputs S 4 are transmitted as Bitstream to a receiver or storage media, not shown.

Figure 7:
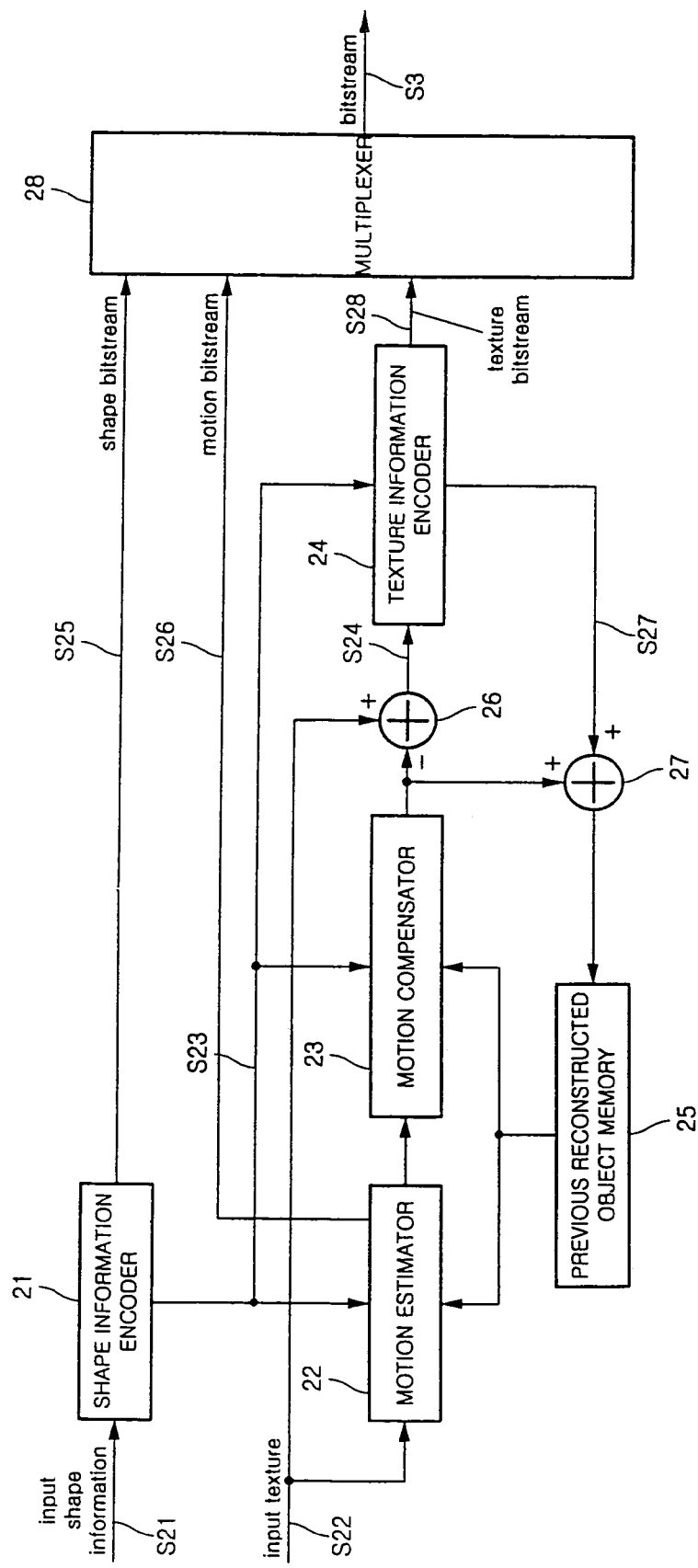
FIG. 7 is a detailed block diagram of the conventional prior art object-based encoder depicted in FIG. 6.

FIG. 7 is a schematic diagram of each of the object encoders forming the object encoding unit 2 depicted in FIG. 6. According to FIG. 6, the object encoding unit is made of many object encoders. The reason for representing plural object encoders is to emphasize that the encoding is performed in units of object. Actually, the object encoder as shown in FIG. 7 performs the encoding as many times as the number of objects. The input signal is information on objects coded and comprises shape information and texture information. This information for a unit frame is input and processed for each frame. The overall structure is similar to that in the frame-based coding, other than a shape information encoder is further included. The shape information, motion information, and texture information is multiplexed to provide a bitstream forming an output signal. Though not shown in the drawings, various overhead information necessary for decoding, for example, the coding type, is multiplexed together.

The shape information and texture information of an object is respectively input into shape information encoder 21 and motion estimator 22. The shape information encoder 21 efficiently encodes the shape information of the object. Reconstructed shape information 523 obtained after the encoding is input into the motion estimator 22, motion compensator 23, and texture information encoder 24 to make the operation performed on basis of object. The other output of the shape information encoder 21, shape bitstream S25, is input into multiplexer 28. It would be noticed that the shape information used for motion compensation and texture information encoding is not input shape information but reconstructed shape information and that this reconstructed shape information should exactly coincide with reconstructed shape information decoded using the shape bitstream in a decoder.

The shape information encoder 21 encodes the shape information using an optimal encoding method among various encoding methods (e.g., lossless coding and lossy coding). When applying the lossless coding, the reconstructed shape information coincides with the input shape information. On the other hand, when applying the lossy coding, the reconstructed shape information is different from the input shape information. In case that shape information used in the encoder is different from the shape information used in the decoder, determination on object pixels and background pixels in the encoder may be different from determination in the decoder. This means that the decoder cannot accurately decode the texture information.

The motion estimator 22 obtains motion information of a present object's texture information using the input texture information S22 of the present object and a previous object's texture information stored in previous reconstructed object memory 25. The obtained motion information is input into the motion compensator 23. The estimated motion information is efficiently encoded and input into the multiplexer 28 as motion bitstream S26. The motion compensator 23 then performs motion compensation prediction using the motion information obtained in the motion estimator 22 and the previous reconstructed object's texture information in the previous reconstructed object memory 25. Subtractor 26 obtains a difference, namely, a prediction error, between the input texture information 22 and the motion compensation predicted texture information obtained in the motion compensator 23 and provides the prediction error to the texture information encoder 24. The texture information encoder 24 encodes the incoming prediction error and a result of the encoding, texture bitstream S28, is input into the multiplexer 28. At the same time, the texture information encoder 24 reconstructs the incoming prediction error signal and provides the reconstructed prediction error signal S27 to adder 27. The adder 27 sums up the reconstructed prediction error signal S27 and the motion compensation predicted signal obtained in the motion compensator 23 and stores a result in the previous reconstructed object memory 25 as a reconstructed texture information signal of the corresponding object. This reconstructed texture 9 information stored is used during the encoding of the next frame that is subsequently input.

The texture information encoder 24 encodes texture information of the corresponding object using the reconstructed shape information obtained from the shape information encoder 21. The texture information is encoded in units of macroblock having a size of M*N, comprising M pixels in horizontal direction and N pixels in vertical direction, instead of in units of object. Here, M and N are even numbers larger than 0, and a representative example is M=N=16.

In FIG. 7, the texture information encoder 24 is shown to encode only the prediction error signal S24, but it may encode the input texture information instead of the prediction error signal' The texture information encoder 24 is allowed to selectively and adaptively encode the prediction error signal and the input texture information to enhance coding efficiency. For example, if the motion information estimation is not accurate, the prediction error signal is large. In this case, encoding of the prediction error signal generates more bits than encoding of the input texture information. For this reason, the coding type indicating the intra or inter macroblock is determined and this coding type is transmitted to the receiver. If the input texture information is encoded, that is, if the coding type is the intra macroblock, the adding step of summing up the reconstructed texture information and the prediction signal is not necessary. Although not shown in FIG. 7, the encoder includes a controller for determining the coding type and controlling the input coding signal using the coding type.

The multiplexer 28 receives and multiplexes the shape bitstream, motion bitstream, texture bitstream, and various overhead information necessary for decoding to generate one bitstream.

Figure 8:
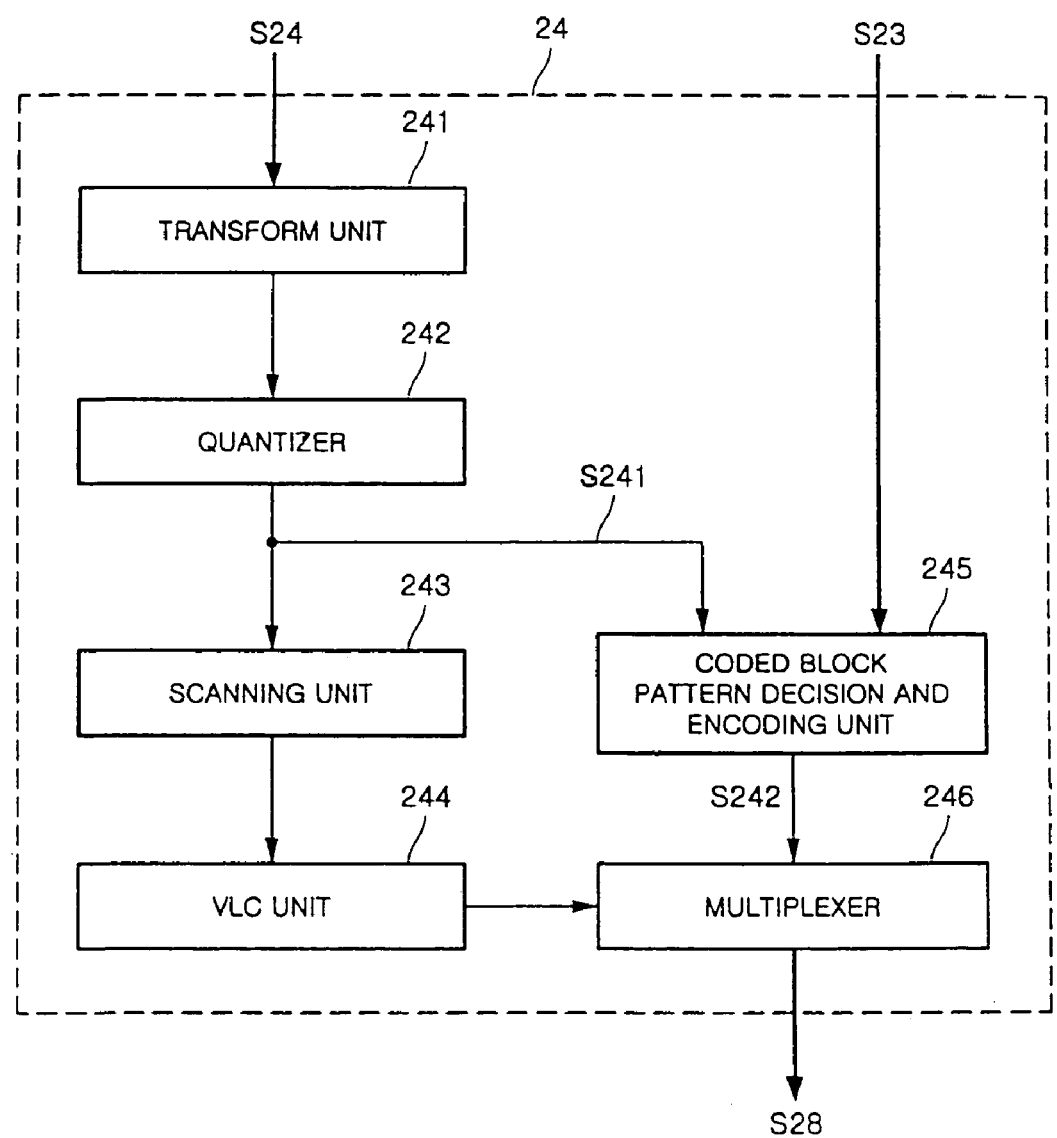
FIG. 8 is a detailed block diagram of a texture information encoder according to the present invention.

FIG. 8 in accordance with the invention shows a config&ation of an improved texture information encoder 24 depicted in FIG. 7 in detail. Input signals S24 and 523 respectively represent—texture information and shape information of a corresponding macroblock.

Transform unit 241 transforms the input texture information to generate transform coefficients. After dividing the macroblock into blocks of a predetermined size (e.g., (M/2) *(N/2), when M=N=16, 8*8), the transform is performed in units of block. As a result of the transform of each block, transform coefficients as many as the number of pixels of the block are generated. For this transform, various existing transform methods such as DCT and DST can be applied. This invention does not limit the transform method to a particular one.

Quantizer 242 receives and quantizes the transform coefficients from the transform unit 241 to generate quantized coefficients.

Scanning unit 243 receives the quantized coefficients from the quantizer 242 and scans them. This scanning re-arranges two-dimensionally positioned quantized coefficients into one dimensionally positioned coefficients to generate small bits. There are various scanning methods. A representative method is zigzag scanning. Other than the zigzag scanning, various existing scanning methods such as alternate scanning can be applied. The present invention does not limit the scanning method to a particular one.

The one-dimensionally positioned quantized coefficients are input into variable length encoder 244. The variable length encoder 244 encodes the input quantized coefficients to efficiently generate a bitstream. The generated texture bitstream is input into multiplexer 246.

The operation of subsequent transform unit, quantizer, scanning unit, and variable length encoder is the same as in conventional and general texture information coding other than the present invention defines a block having at least one object pixel as non-transparent block and a block having no object pixel as a transparent block during the object-based coding for encoding an arbitrarily shaped object. The transform unit, quantizer, scanning unit, and variable length encoder do not perform their operations with respect to the transparent block not having texture information of the object transmitted. They perform their operations with respect to only the non-transparent block having the texture information transmitted.

In the object-based coding, an object pixel and a background pixel may be present in a block of a predetermined size at the same time as show in FIG. 4. For encoding such block, shape-adaptive DCT that encodes only the texture information of an object pixel can be applied. There is also another method of obtaining the texture information of a background pixel using the texture information of an object pixel and performing the conventional transform in units of block with respect to a signal of a whole block. The present invention does not limit the transform to a particular method.

Coded block pattern decision and encoding unit 245 decides a coded block pattern of the corresponding macroblock and variable length codes the decided coded block pattern. As illustrated above, the conventional frame-based coding decides the coded block pattern and performs the VLC. This system can be applied to the object-based coding. The conventional technique uses one VLC table for all the blocks of the macroblock without discrimination of blocks having the texture information and blocks not having the texture information, thereby decreasing efficiency in encoding the coded block patterns.

The present invention selectively uses different VLC tables stored in a memory for encoding coded block patterns according to the number of blocks where an object is present (the number of blocks having the texture information) when encoding coded block patterns of respective macroblocks. For this purpose, the coded block pattern decision and encoding unit 245 receives the shape information S23 and decides a coded block pattern using the shape information. Since the shape information is also transmitted to the decoder, it is not necessary to transmit overhead information on which VLC table is selected for encoding the coded block pattern in the encoder. The decoder in the receiver also decodes the coded block pattern with the same VLC table as selected in the encoder based upon reconstructed shape information that coincides with the shape information S23 used in the encoder. The coded block pattern bitstream encoded in the coded block pattern decision and encoding unit 245 is transmitted to the multiplexer 246. The multiplexer 246 then multiplexes the coded block pattern bitstream and the texture bitstream received from the variable length encoder 244 to provide an output.

Figure 9:
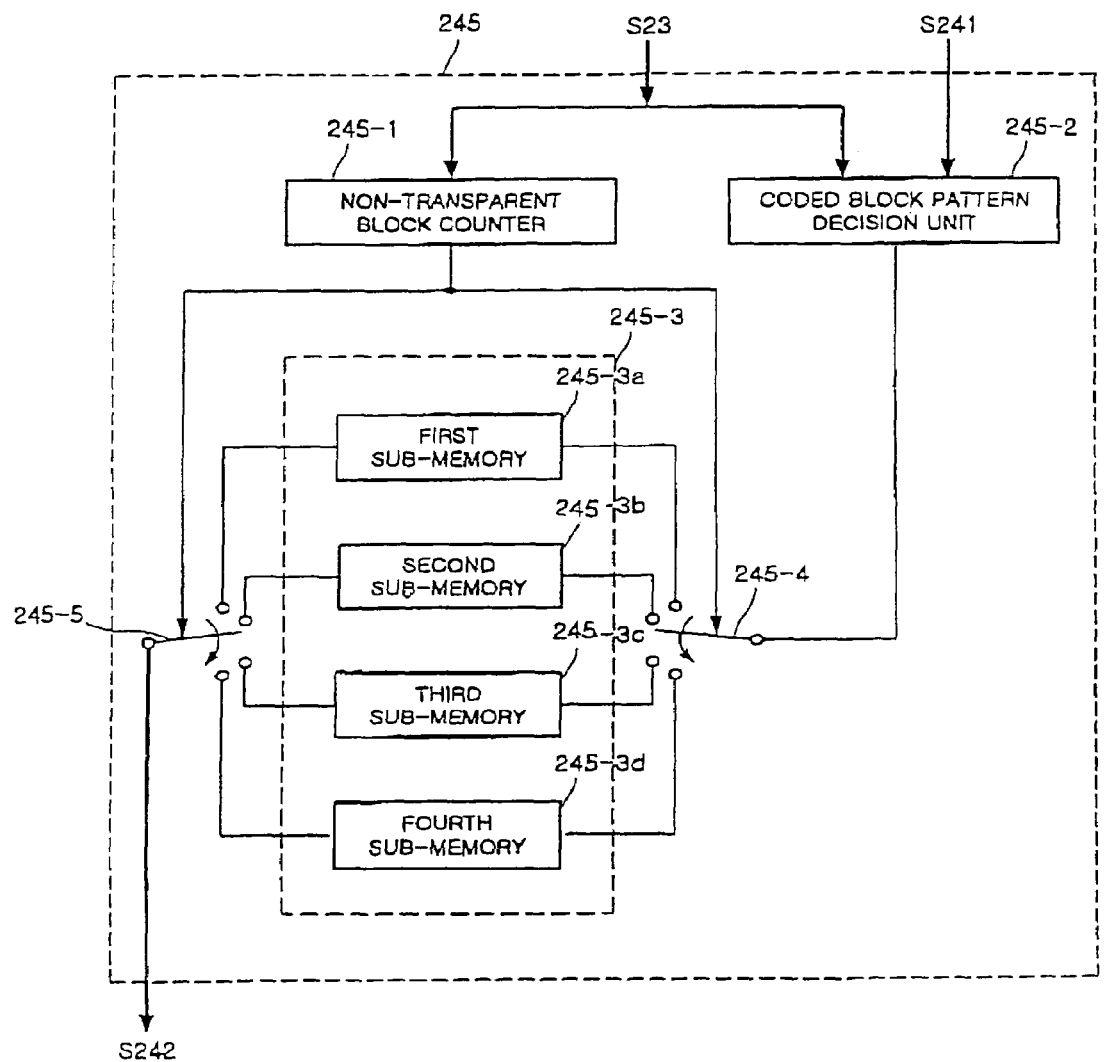
FIG. 9 is a detailed block diagram of a coded block pattern encoder according to the present invention.

FIG. 9 shows a configuration of a coded block pattern encoding device according to the present invention. Input signals of coded block pattern decision unit 245-2 are the quantized coefficients S241 from the quantizer 242 and the input shape information shown in FIG. 8. The coded block pattern decision unit 245-2 decides and outputs a coded block pattern of the corresponding macroblock based upon the two kinds of input signals. Specifically, once receiving the quantized coefficients of the macroblock, the coded block pattern decision unit 245-2 decides whether or not each block has an object pixel based upon the input shape information. If the block has the object pixel, the quantized coefficients of the corresponding block are checked to determine whether or not there exists data to be transmitted. If there exists data to be transmitted, the coded block pattern of the corresponding block is set to "1", and if not, the coded block pattern of the corresponding block is set to "0". According to such operation, coded block patterns for the input macroblock of all the blocks are decided, then the coded block patterns are combined on the basis of macroblock. Finally, the coded block pattern decision unit 245-2 provides information for allowing a code corresponding to the coded block pattern to be read from the VLC table.

Non-transparent block counter 245-1 has the input shape information S23 shown in FIG. 8 as its input signal. Once receiving the shape information, the non-transparent block counter 245-1 counts the number of non-transparent blocks having object pixels and provides count information. The information on the number of the blocks controls switching operation of switches 245-4 and 245-5.

VLC table memory 245-3 stores a plurality of VLC tables. FIG. 9 shows an example of the case that four blocks are present in one macroblock. If the macroblock comprises L blocks instead of 4 blocks, the VLC table memory 245-3 comprises L sub-memories. Each sub-memory has a different length (the number of possible cases) of 2, 4, 8, 16, $2_{L-1}$ or $2_L$. As shown in FIG. 9, when one macroblock consists of four blocks and when the VLC table memory 245-3 comprises four sub-memories, the submemories 1, 2, 3, and 4 respectively have a length of 2, 4, 8, and 16. It would be noticed that the VLC table might not be necessary when there is one non-transparent block having at least one object pixel. In this case, there are only two cases and the coded block pattern can be represented with 1 bit.

If different VLC tables are used for the intra macroblock and inter macroblock, two VLC table memories are needed. Although not shown in FIG. 9, a control signal for selecting one of the memories, namely, a coding type (a signal indicating that a corresponding macroblock is the intra macroblock or inter macroblock) is input. On the other hand, if one VLC table is used for the intra and inter macroblocks as shown in FIG. 4, two memories are not necessary even though the coding type is input.

Figure 10:
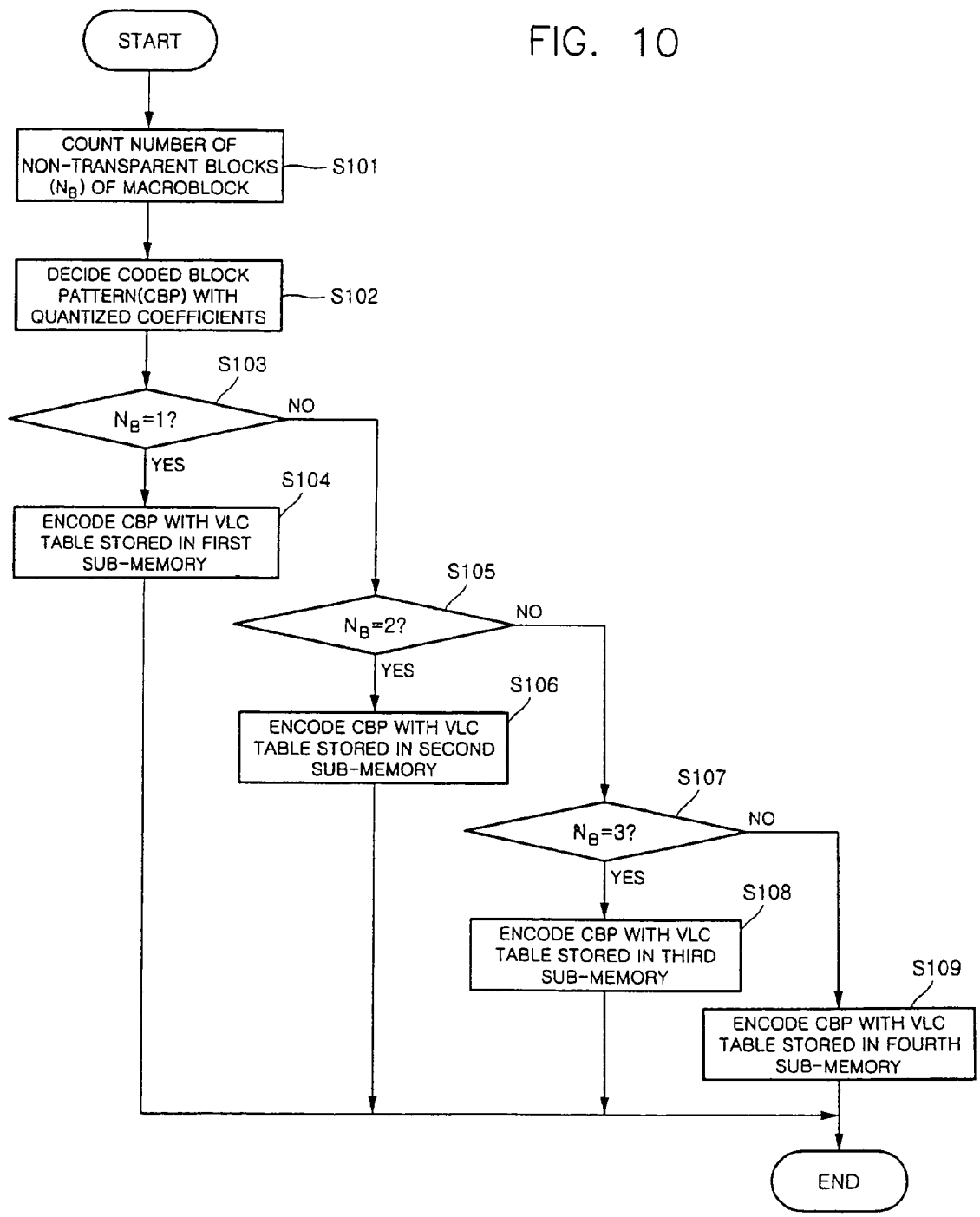
FIG. 10 is a flowchart of a coded block pattern coding method according to the present invention.

FIG. 10 is a flow chart of a coded block pattern encoding method according to the present invention. Here, a character "S" indicates a step and "$N_B$" indicates the number of non-transparent blocks. This flow chart shows a coded block pattern encoding method applied to a macroblock consisting of four blocks.

Primarily, the number, $N_B$, of non-transparent blocks in a corresponding macroblock is measured using shape information of the input macroblock (S101). Quantized coefficients are checked to decide a coded block pattern (S102). The measured number of non-transparent blocks is checked (S103, S105, and S107) and a sub-memory (that stores a VLC table corresponding to the number of non-transparent blocks) is selected according to the number of non-transparent blocks to encode the coded block pattern (S104, S106, S108, and S109).

Specifically, if the number of non-transparent blocks, $N_B$, is "1", the VLC table stored in first sub-memory 245-3a is used for the coded block pattern encoding. The first sub-memory 245-3a stores the VLC table having the length of 2. If the number of non-transparent blocks, $N_B$, is "2", the VLC table stored in second sub-memory 245-3b is used for the coded block pattern encoding. The second sub-memory 245-3b stores the VLC table having the length of 4. If the number of non-transparent blocks, $N_B$, is "3", the VLC table stored in third sub-memory 245-3c is used for the coded block pattern encoding. The third sub-memory 245-3c stores the VLC table having the length of 8. If the number of nontransparent blocks, $N_B$, is "4", the VLC table stored in fourth sub-memory 245-3d is used for the coded block pattern encoding. The fourth sub-memory 245-3d stores the VLC table having the length of 16. In the last case, the length of the VLC table is the same as that of the VLC table used in the conventional frame-based coding, so the conventional VLC table as shown in FIG. 4 can be used as it is. When the macroblock having the size of M pixels/lines*N lines/macroblocks consists of L blocks as explained in FIG. 9, this flow chart can be extended.

More specifically describing, the blocks Y2, Y3, and Y4 of MB1 are the non-transparent blocks having object pixels. According to the conventional art, three non-transparent blocks are discrete cosine transformed and quantized and one of 16 coded block patterns is selected and encoded. The block Y1 is a transparent block and does not have transform coefficients transmitted. This information is informed to the decoder through the transmitting shape information. Therefore, it is appreciated that the coded block pattern of MB1 to be encoded is one of 8 patterns. As widely known through Shannon's information theory, compared with VLC of 16 coded block patterns, VLC of 8 coded block patterns is more advantageous in an aspect of coding gain (because the less amount of bits is generated, higher coding efficiency is achieved).

Figure 1:
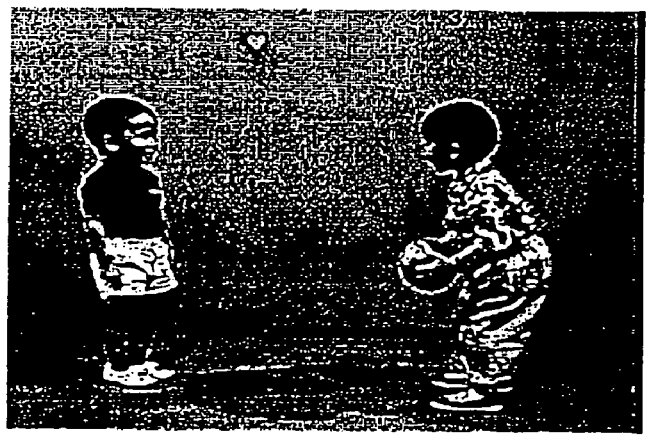
FIG. 1 shows an example of a test image used for explaining video signal compression encoding and decoding.
Figure 2:
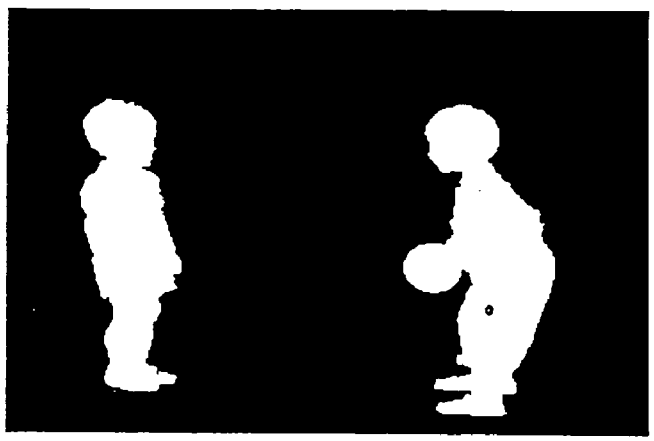
FIG. 2 is a binary mask representation of shape information of the image depicted in FIG. 1.
Figure 3:
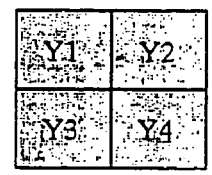
FIG. 3 shows a macroblock divided into four blocks.
Figure 5:
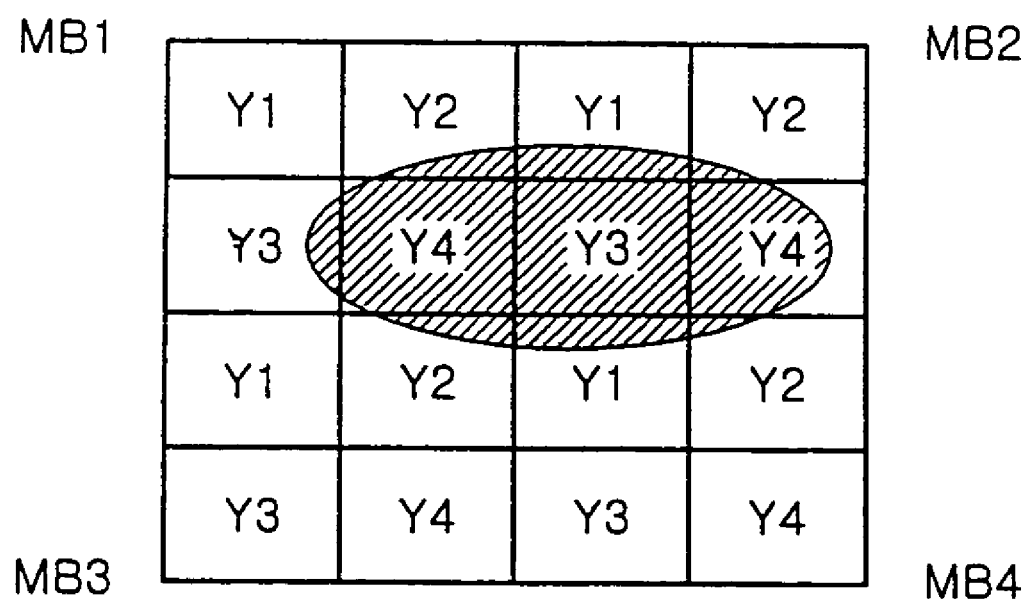
FIG. 5 is an example for explaining boundary macroblocks.

The present invention provides the VLC table for the 8 coded block patterns as shown in FIG. 13. This table is stored in the third sub-memory 245-3c. The structure of the table is the same as that of FIG. 4 other than the number of coded block patterns is 8. "1, 2, 3" shown at second and third columns of the first row indicates three non-transparent blocks of a corresponding macroblock in order of Y1→Y2→Y3→Y4. In FIG. 5, "1, 2, 3" of MB1 is (Y2, Y3, Y4). For example, "001" in the second column of FIG. 13 means that the blocks Y2 and Y3 do not have data transmitted and the block Y4 has data transmitted. FIG. 13 has the same structure as FIG. 4. Namely, VLC tables for the intra macroblock and inter macroblock can use only one memory. For example, the same code is used for the coded block pattern "001" of three blocks of the intra macroblock and the coded block pattern "110" of the inter macroblock during the encoding. Using the same VLC table for both the intra macroblock and the inter macroblock reduces memory requirement. It is needless to say that different memories should be used if frequency in occurrence of coded block patterns of the two kinds of macroblocks does not satisfy the above feature.

Actually, the memory shown in FIG. 9 may store different tables for the intra macroblock and the inter macroblock. If the same VLC table is used for the two kinds of macroblocks as shown in FIG. 13, coding type information should be input and control the memory in FIG. 9.

MB3 and MB4 of FIG. 5 respectively have one and two non-transparent blocks. VLC tables having length of 2 and 4 are used for MB3 and MB4 to obtain coding gains. The VLC table having a length of 2 is shown in FIG. 11 and the VLC table having a length of 4 is shown in FIG. 12.

The VLC tables shown in FIG. 11, FIG. 12, and FIG. 13 are made using the Huffman code. For example, other VLC tables may be used for encoding coded block patterns according to an application or problems of embodiment. A probability table for arithmetic coding is a representative example.

The following description concerns how the coded block pattern encoded and transmitted from the encoder is decoded in the decoder.

Figure 14:
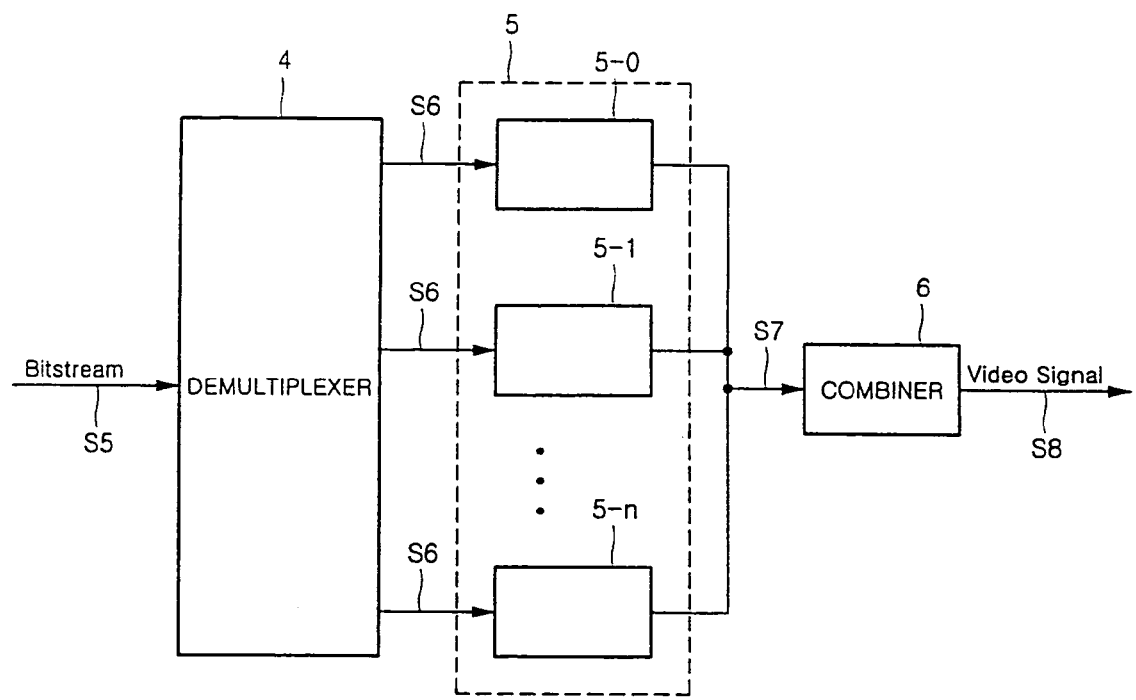
FIG. 14 is a schematic block diagram of a conventional prior art object-based decoder.

FIG. 14 shows a schematic prior art configuration of a conventional object-based video signal decoding system. Input bitstream S5 is demultiplexed into bitstreams by objects in demultiplexer 4. Individual bitstreams S6 of respective objects are separately decoded at object decoders 5-0, 5-1, . . . , 5-n, in object decoding unit 5. Reconstructed object signals S7 from the object decoders 5-0, 5-1, . . . , 5-n are composited in compositor 6 to provide single video signal S8.

Figure 15:
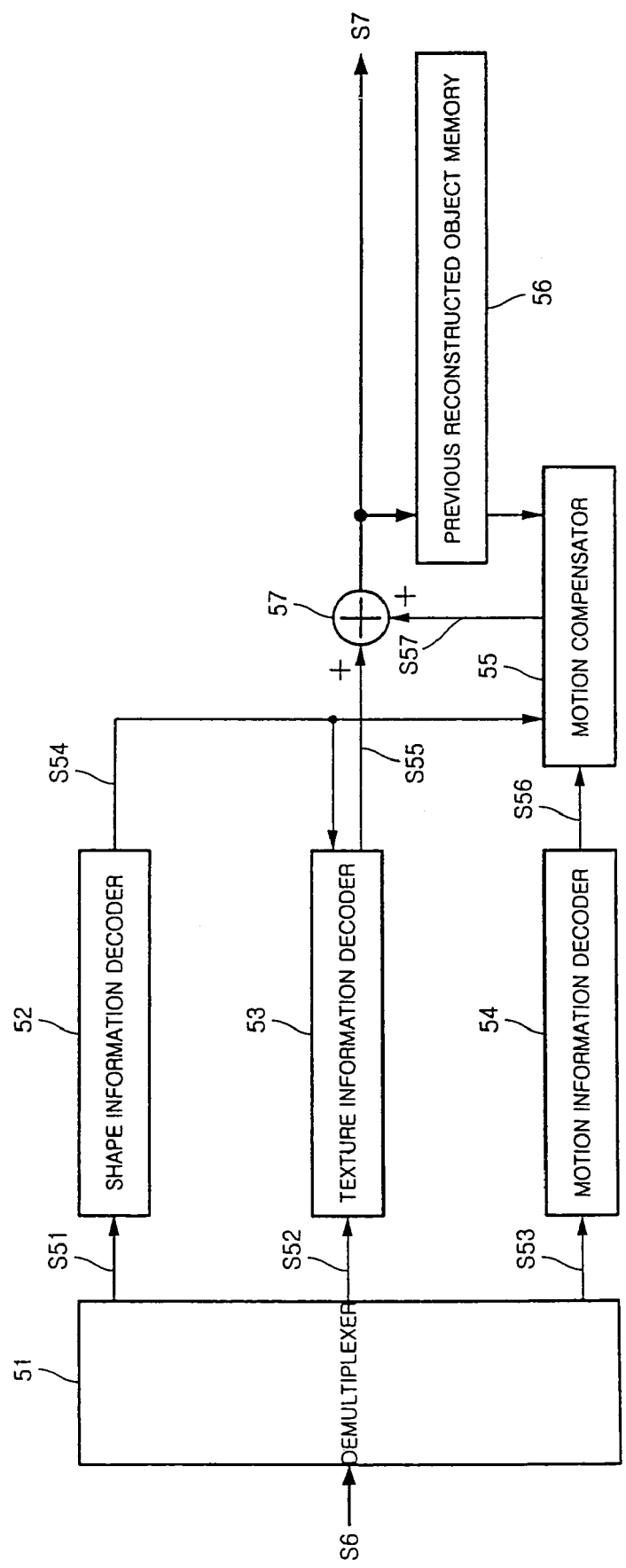
FIG. 15 is a detailed block diagram of the conventional object-based prior art decoder depicted in FIG. 14.

FIG. 15 shows a detailed configuration of one of the prior art object decoders at the object decoding units in the object-based video signal decoding system depicted in FIG. 14. The object decoding unit 5 is shown to have a plurality of object decoders 5-0, 5-1, . . . , 5-n in FIG. 14 to emphasize that the decoding is performed in units of object. Actually, the object decoder repeatedly operates to individually decode signals of respective objects. As shown in FIG. 15, object bitstream S6 is demultiplexed into motion bitstream S53, shape bitstream S51, and texture bitstream S52 in the demultiplexer 51 and respectively input into decoders 52–54. Shape information decoder 52 receives the shape bitstream S51 and generates reconstructed shape information S54. This reconstructed shape information is input into motion compensator 55 and texture information decoder 53 to permit the decoding on basis of object. Namely, it is intended that only object pixels are reconstructed. The texture information decoder 53 receives the texture bitstream S52 and performs texture information decoding. The texture information decoder 53 also receives the reconstructed shape information from the shape information decoder 52 and uses the information during the texture information decoding to decode only the object. Motion information decoder 54 receives the motion bitstream S53 and decodes motion information. Motion compensator 55 performs motion compensation prediction using the motion information from the motion information decoder 54 and previous texture information from previous reconstructed object memory 56. At this time, the reconstructed shape information generated from the shape information decoder 52 is input and used in the motion compensator 55. This reconstructed shape information is the same as the reconstructed shape information generated from the shape information encoder 21 depicted in FIG. 7. Motion compensation predicted signal S57 generated from the motion compensator 55 is added to reconstructed texture information S55 generated from the texture information decoder 53 in adder 57 to reconstruct the corresponding object. The reconstructed object is stored in the previous reconstructed object memory 56 and used for decoding the next frame while it is input into the compositor 6 of FIG. 14 and composited with other object to reconstruct a video signal.

As in FIG. 7, the coding type of macroblock is not shown in FIG. 15. If the macroblock to be decoded is the intra macroblock, namely, if the input video signal was encoded, the output of the texture information decoder is not the prediction error but reconstructed video signal and the operation of the adder 57 is not necessary.

Figure 16:
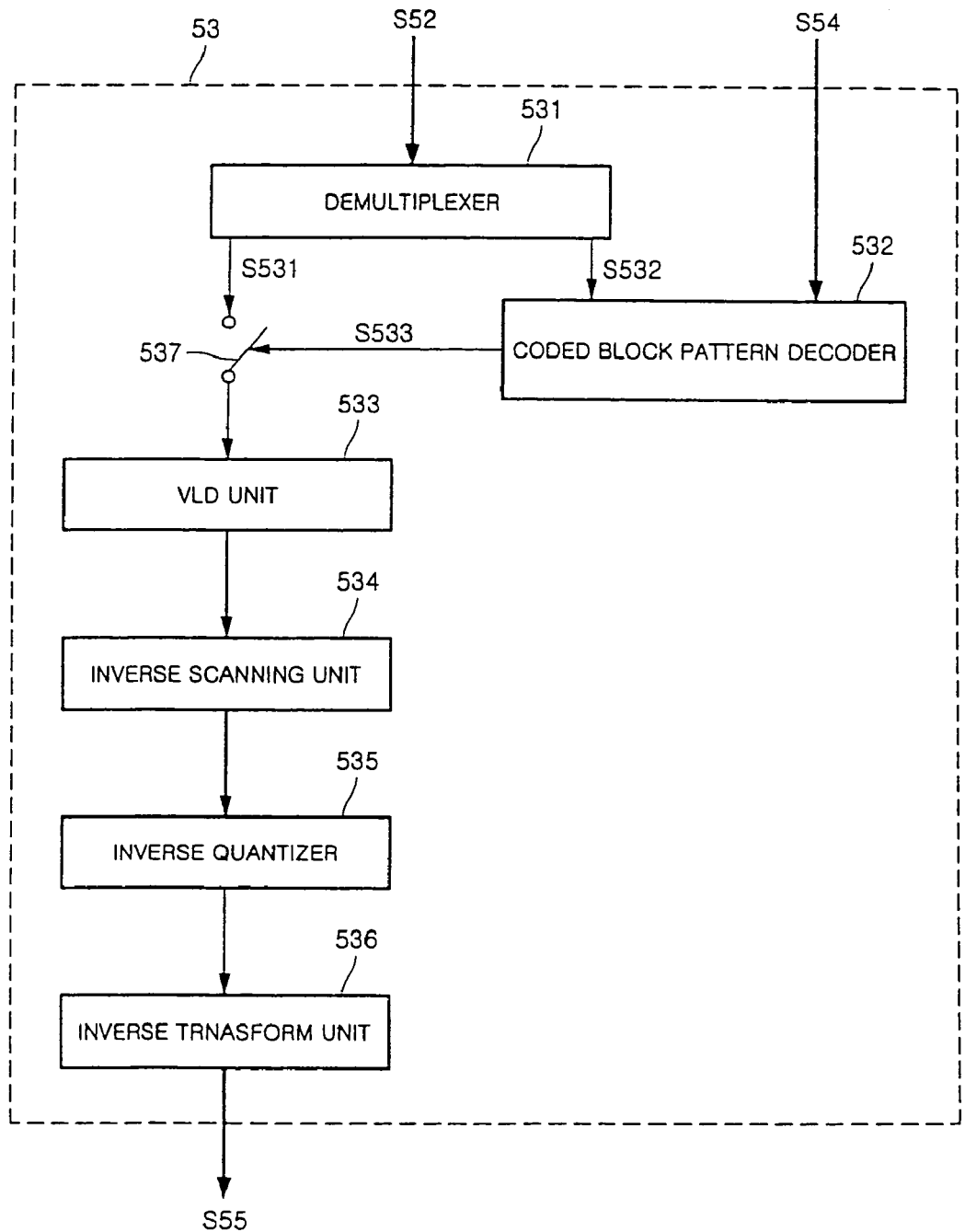
FIG. 16 is a detailed block diagram of a texture information decoder according to the present invention.

FIG. 16 shows a detailed configuration of the texture information decoder 53 depicted in FIG. 15. Once receiving the texture bitstream S52, demultiplexer 531 demultiplexes the input texture bitstream S52 into coded block pattern bitstream S532 and transform coefficient bitstream S531. Coded block pattern decoder 532 decodes the coded block pattern received from the demultiplexer 531 using the shape information signal S54 received from the shape information decoder 52 depicted in FIG. 15 and controls switch 537 with a result signal S533.

Generally, the texture information decoder receives and decodes the transform coefficients in units of block. The decoding step comprises VLD of the transform coefficients, inverse scanning, inverse quantization, and inverse transform. The configuration of FIG. 16 is also designed to perform the decoding according to the above order. VLD unit 533 decodes the transform coefficient bitstream received in units of block to provide transform coefficients arranged in one dimension. Inverse scanning unit 534 marshals the one-dimensionally input transform coefficients in aspect of a two-dimensional signal of the size "M/2*N/2" according to a prescribed manner. The inverse scanning is performed in reverse order of the zigzag scanning or alternate scanning that is prescribed. Inverse quantizer 535 inverse-quantizes the two-dimensionally arranged texture information received from the inverse scanning unit 534. The inverse-quantized texture information is inverse-transformed in inverse transform unit 536 to generate reconstructed texture information.

It is determined whether or not the above series of steps (VLD, inverse scanning, inverse quantization, inverse transform) is necessary according to the coded block pattern S533 generated from the coded block pattern decoder 532. How many blocks should be decoded can be known from the decoded coded block pattern. After counting the number of blocks, the switch 537 is opened. Although not shown in the drawing, there should be provided a step of making a reconstructed macroblock by appropriately disposing the blocks' texture information reconstructed according to the shape information S54 and coded block pattern information. Specifically describing, which blocks include at least one object pixel can be known from the input shape information. This information is used for decoding the coded block pattern. Which blocks and how many blocks are decoded through the above series of steps can be known from the decoded coded block pattern. Reconstruction of the texture information of the macroblock is effected using such information.

Figure 17:
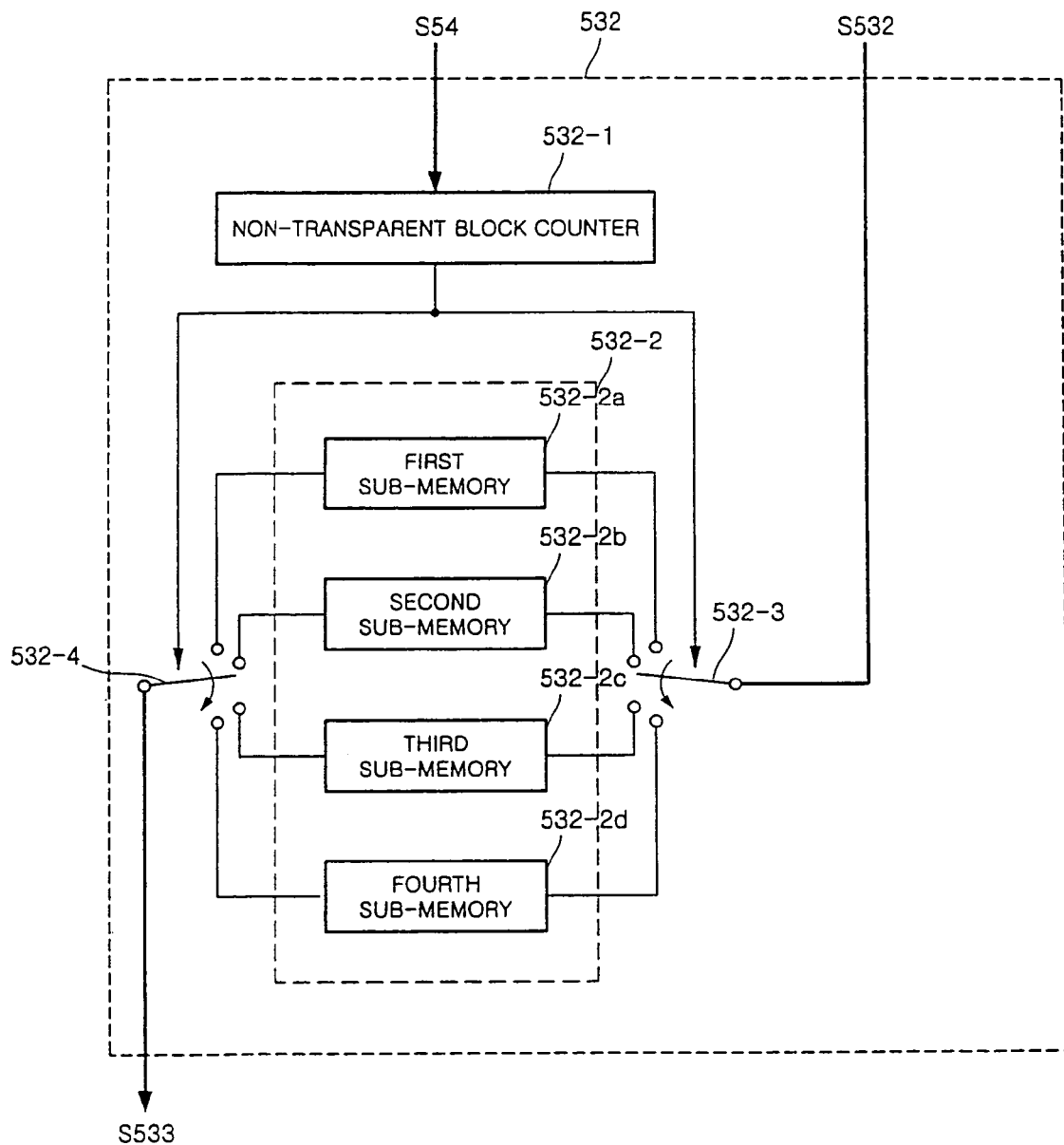
FIG. 17 is a block diagram of a coded block pattern decoder according to the present invention.

FIG. 17 shows a detailed configuration of the coded block pattern decoder 532 depicted in FIG. 16. As shown in FIG. 17, inputs of the coded block pattern decoder 532 are the shape information S54 and the coded block pattern bitstream S532 and its output is the coded block pattern S533. Non-transparent block counter 532-1 counts the number of non-transparent block having at least one object pixel based upon the shape information S54. Switches 532-3 and 532-4 are controlled according to the number of blocks having the object pixel to select a VLD table for coded block pattern bitstream decoding. For example, if the number of non-transparent blocks is "1", the non-transparent block counter 532-1 controls the switches 532-3 and 532-4 to select first sub-memory 532-2a in VLD table memory 532-2. The input coded block pattern bitstream S532 is then applied to the first sub-memory 532-2a in the VLD table memory 532-2 via the switch 532-3. A code of the coded block pattern bitstream is compared with codes stored in the corresponding sub-memory to find the same code and a coded block pattern corresponding to the same code is output. The coded block patterns is then output via the switch 532-4 as the decoded coded block pattern S533 to control the switch 537 depicted in FIG. 16.

Figure 18:
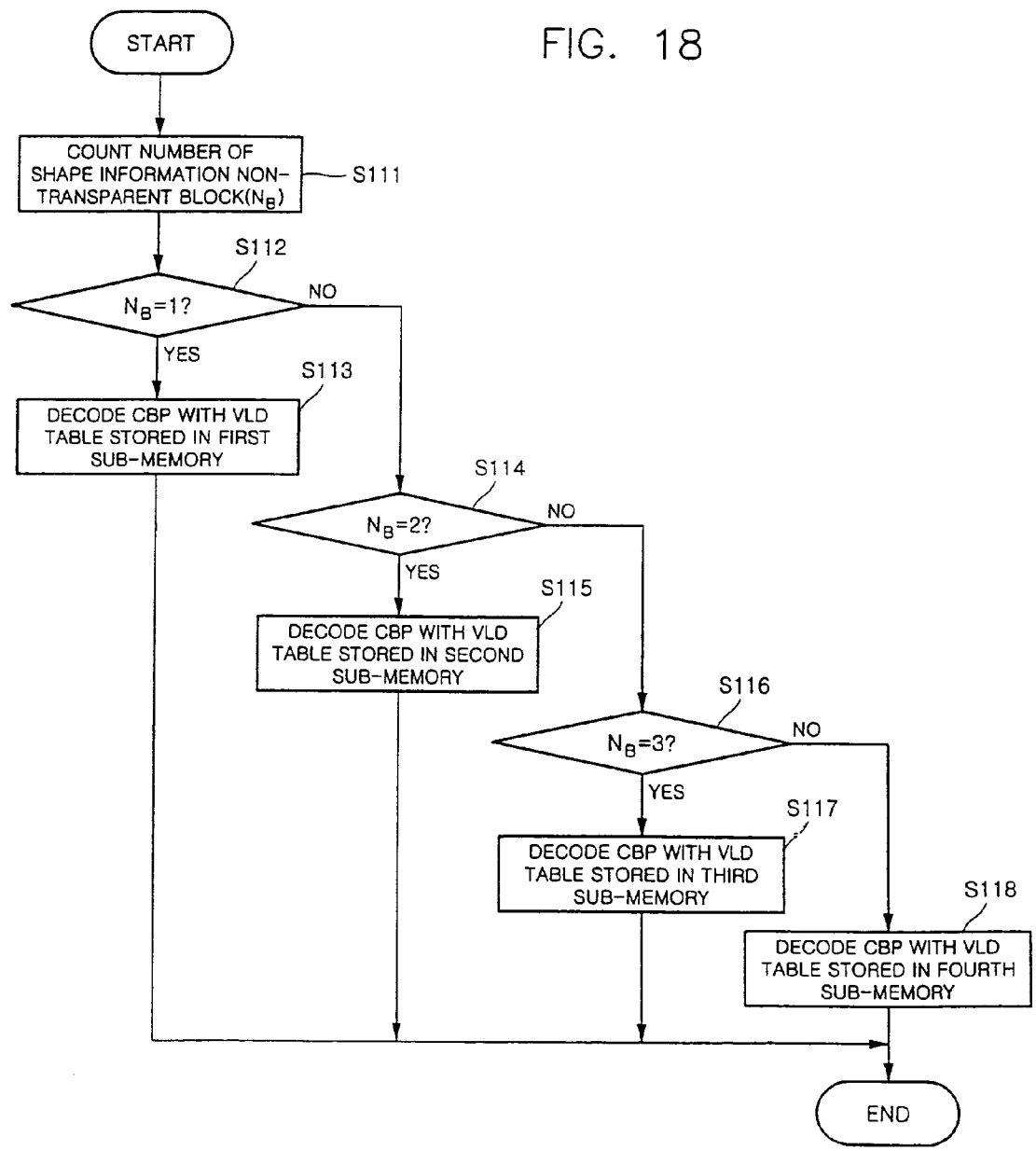
FIG. 18 is a flow chart of a coded block pattern decoding method according to the present invention.

FIG. 18 is a flow chart of a coded block pattern decoding method according to the present invention. Here, a character "S" indicates a step and "$N_B$" indicates the number of non-transparent blocks.

Primarily, the number of non-transparent blocks, $N_B$, of a macroblock is obtained using input shape information (S111). The obtained number of non-transparent blocks is checked (S112, S114, S116) and a sub-memory in the VLD table memory 532-2 is selected according to a result value of the checking operation to decode an incoming coded block pattern bitstream (S113, S115, S117, S119).

For example, if the number of non-transparent blocks, $N_B$, of the macroblock decoded is "1", the coded block pattern is decoded using a VLD table stored in first sub-memory 532-2a in the VLD table memory S32-2. The first sub-memory ?32-2a stores the VLD table having a length of "2" (the number of possible cases). If the number of non-transparent blocks, $N_B$, of the macroblock decoded is "2", the coded block pattern is decoded using a VLD table stored in the second sub-memory 532-2b in the VLD table memory 532-2. The second sub-memory 532-2b stores the VLD table having a length of "4". If the number of non-transparent blocks, $N_B$, of the macroblock decoded is "3", the coded block pattern is decoded using a VLD table stored in the third sub-memory 532-2c in the VLD table memory 532-2. The third sub-memory 532-2c stores the VLD table having a length of "8". If the number of non-transparent blocks, $N_B$, of the macroblock decoded is "4", the coded block pattern is decoded using a VLD table stored in the fourth sub-memory 532-2d in the VLD table memory 532-2. The fourth sub-memory 532-2d stores the VLD table having a length of "16". The YLD table used in the last case may coincide with the VLD table used in a conventional coded block pattern decoder.

As in the description on FIG. 9 and FIG. 10, FIG. 17 and FIG. 18 can be extended to the case that the macroblock comprises L blocks. In other words, the number of sub-memories depicted in FIG. 17 is equal to the number of blocks in the macroblock.

Similar to the embodiment of FIG. 9, the embodiment of FIG. 17 may use the VLD tables depicted in FIG. 4, FIG. 11, FIG. 12, and FIG. 13. Namely, the VLD table for the intra macroblock and the inter macroblock can use only one memory. For example, the same code is used for a coded block pattern "001" of three non-transparent blocks of the intra macroblock and a coded block pattern "110" of the inter macroblock during the decoding. Using the same VLD table for both the intra macroblock and the inter macroblock reduces memory requirement. It is needless to say that different memories should be used if frequency in occurrence of coded block patterns of the two kinds of macroblocks does not satisfy the above feature.

Actually, the memory shown in FIG. 17 may store different tables for the intra macroblock and the inter macroblock. If the same VLD table is used for the two kinds of macroblocks as shown in FIG. 4, FIG. 11, FIG. 12, and FIG. 13, coding type information should be input to control the memory in FIG. 17

The texture information coded according to the present invention may be luminance signals or chrominance signals. In other words, the present invention may be applied to the case that a macroblock comprises a plurality of blocks and includes non-transparent blocks and transparent blocks.

Specifically speaking, color video generally comprises luminance signals indicating brightness of pixels and chrominance signals indicating color values, The color video may have different luminance resolution and chrominance resolution. For example, one luminance pixel may be matched with one chrominance signal, two luminance pixels may be matched with one chrominance signal, or four luminance pixels may be matched with one chrominance signal. The above three cases are called 4:4:4 video format, 4:2:2 video format, and 4:2:0 video format. If an input video signal has 4:2:0 video format, the present invention is applied to only luminance signal coding. If the video format is 4:4:4, the present invention can also be applied to the coding of coded block pattern of a chrominance signal.

If the video format is 4:2:2, the present invention is applied to the coding of luminance signals and the coding of chrominance signals in different way. Differently from the luminance signal, two chrominance signal blocks are generated per macroblock. In other words, there is only the case that the number of non-transparent blocks is 1 or 2, so only two VLC or VLD tables are required (L=2). In this case, the number of non-transparent blocks is also obtained using shape information and a VLC or VLD table is adaptively selected using the obtained number of non-transparent blocks to encode or decode a coded block pattern.

As illustrated above, the present invention selectively applies one of VLC tables stored in a memory for encoding a coded block pattern of a macroblock according to the number of blocks having an object within the macroblock, the number of blocks obtained using shape information, thereby reducing the amount of data generated during the coding.

The present invention also selectively applies one of VLD tables stored in a memory for decoding a coded block pattern of a macroblock according to the number of blocks having an object within the macroblock, the number of blocks obtained using shape information, thereby readily decoding a coded block pattern bitstream that is efficiently coded.

It will be apparent to those skilled in the art that various modifications and variations can be made in coded block pattern encoding/decoding apparatus and method of the present invention without deviating from the spirit or scope of the invention. Thus, it is intended that the present invention covers the modifications and variations of this invention provided they come within the scope of the appended claims and their equivalents.

What is claimed is:

1. An apparatus for coding luminance information in a block format by adaptively using different variable length code (VLC) tables according to the number of non transparent blocks in a macroblock to be coded, said apparatus comprising:
a coded block pattern decision unit for determining a coded block pattern for luminance(CBPY) indicating whether or not coded texture data is transmitted for each of plural luminance blocks;
a VLC table memory for storing the different VLC tables corresponding to the number of non transparent blocks in the macroblock, each of VLC tables having variable length codes representing each of coded block patterns for luminance; and
a multiplexer for multiplexing the variable length code corresponding to the coded block pattern for luminance (CBPY) along with another macroblock header information.

2. The apparatus as recited in claim 1, wherein the non transparent blocks represent luminance blocks with at least one non intra DC transform coefficient in a macroblock.

3. The apparatus as recited in claim 1, wherein the plural luminance blocks comprise four blocks of 8 by 8 pixel size.

4. The apparatus as recited in claim 1, wherein said VLC table memory stores:
a first VLC table for one non-transparent block in a macroblock;
a second VLC table for two non-transparent blocks in a macroblock;
a third VLC table for three non-transparent blocks in a macroblock; and
a fourth VLC table for four non-transparent blocks in a macroblock.

5. The apparatus as recited in claim 4, wherein the first VLC table is represented as follows:

| CBPY(INTRA) | CBPY(INTER) | CODE |
|---|---|---|
| 0 | 1 | 01 |
| 1 | 0 | 1. |

6. The apparatus as recited in claim 4, wherein the second VLC table is represented as follows:

| CBPY(INTRA) | CBPY(INTER) | CODE |
|---|---|---|
| 00 | 11 | 0001 |
| 01 | 10 | 001 |
| 10 | 01 | 01 |
| 11 | 00 | 1. |

7. The apparatus as recited in claim 4 wherein the third VLC table is represented as follows:

| CBPY(INTRA) | CBPY(INTER) | CODE |
|---|---|---|
| 000 | 111 | 011 |
| 001 | 110 | 000001 |
| 010 | 101 | 00001 |
| 011 | 100 | 010 |
| 100 | 011 | 00010 |
| 101 | 010 | 00011 |
| 110 | 001 | 001 |
| 111 | 000 | 1. |

8. The apparatus as recited in claim 4, wherein the fourth VLC table is represented as follows:

| CBPY(INTRA) | CBPY(INTER) | CODE |
|---|---|---|
| 0000 | 1111 | 0011 |
| 0001 | 1110 | 00101 |
| 0010 | 1101 | 00100 |

-continued

| CBPY(INTRA) | CBPY(INTER) | CODE |
|---|---|---|
| 0011 | 1100 | 1001 |
| 0100 | 1011 | 00011 |
| 0101 | 1010 | 0111 |
| 0110 | 1001 | 000010 |
| 0111 | 1000 | 1011 |
| 1000 | 0111 | 00010 |
| 1001 | 0110 | 000011 |
| 1010 | 0101 | 0101 |
| 1011 | 0100 | 1010 |
| 1100 | 0011 | 0100 |
| 1101 | 0010 | 1000 |
| 1110 | 0001 | 0110 |
| 1111 | 0000 | 11. |

9. An apparatus for decoding luminance information in a block format by adaptively using different variable length code (VLC) tables according to the number of non transparent blocks in a macroblock to be decoded, said apparatus comprising:
   a de-multiplexer for retrieving a coded pattern for luminance(CBPY) for the macroblock from a received bitstream, wherein the coded block pattern indicates which of plural luminance blocks have DC transform coefficient data in the macroblock;
   a texture decoder for decoding coded texture data using the coded block pattern for luminance(CBPY) for the macroblock, by skipping decoding for luminance blocks with no transmitted DC transform coefficients upon the coded block pattern for luminance(CBPY).

10. The apparatus as recited in claim 9, wherein non transparent blocks represent luminance blocks with at least one non intra DC transform coefficient in a macroblock.

11. The apparatus as recited in claim 9, wherein said variable length code(VLC) tables comprise:
   a first VLC table for one non-transparent block in a macroblock;
   a second VLC table for two non-transparent blocks in a macroblock;
   a third VLC table for three non-transparent blocks in a macroblock; and
   a fourth VLC table for four non-transparent blocks in a macroblck.

12. The apparatus as recited in claim 11, wherein the first VLC table is represented as follows:

| CBPY(INTRA) | CBPY(INTER) | CODE |
|---|---|---|
| 0 | 1 | 01 |
| 1 | 0 | 1. |

13. The apparatus as recited in claim 11, wherein the second VLC table is represented as follows:

| CBPY(INTRA) | CBPY(INTER) | CODE |
|---|---|---|
| 00 | 11 | 0001 |
| 01 | 10 | 001 |
| 10 | 01 | 01 |
| 11 | 00 | 1. |

14. The apparatus as recited in claim 11 wherein the third VLC table is represented as follows:

| CBPY(INTRA) | CBPY(INTER) | CODE |
|---|---|---|
| 000 | 111 | 011 |
| 001 | 110 | 000001 |
| 010 | 101 | 00001 |
| 011 | 100 | 010 |
| 100 | 011 | 00010 |
| 101 | 010 | 00011 |
| 110 | 001 | 001 |
| 111 | 000 | 1. |

15. The apparatus as recited in claim 11, wherein the fourth VLC table is represented as follows:

| CBPY(INTRA) | CBPY(INTER) | CODE |
|---|---|---|
| 0000 | 1111 | 0011 |
| 0001 | 1110 | 00101 |
| 0010 | 1101 | 00100 |
| 0011 | 1100 | 1001 |
| 0100 | 1011 | 00011 |
| 0101 | 1010 | 0111 |
| 0110 | 1001 | 000010 |
| 0111 | 1000 | 1011 |
| 1000 | 0111 | 00010 |
| 1001 | 0110 | 000011 |
| 1010 | 0101 | 0101 |
| 1011 | 0100 | 1010 |
| 1100 | 0011 | 0100 |
| 1101 | 0010 | 1000 |
| 1110 | 0001 | 0110 |
| 1111 | 0000 | 11. |

* * * * *